(12) United States Patent
Henry

(10) Patent No.: US 7,145,079 B1
(45) Date of Patent: Dec. 5, 2006

(54) MODULAR CABLE PROTECTOR

(76) Inventor: Stephen K. Henry, 3825 Northbrook Dr., #F, Boulder, CO (US) 80302

( * ) Notice: Subject to any disclaimer, the term of this patent is extended or adjusted under 35 U.S.C. 154(b) by 0 days.

(21) Appl. No.: 11/508,584

(22) Filed: Aug. 23, 2006

(51) Int. Cl.
*H02G 3/30* (2006.01)
*E01B 7/28* (2006.01)

(52) U.S. Cl. .............. 174/101; 174/72 C; 174/97; 14/69.5; 104/275

(58) Field of Classification Search ........... 174/50, 174/68.1, 70 C, 70 R, 72 C, 95, 97, 101, 174/481, 482, 484; 14/69.5; 104/275; 138/103, 138/105, 106, 110; 404/3; D13/155
See application file for complete search history.

(56) References Cited

U.S. PATENT DOCUMENTS

| | | | |
|---|---|---|---|
| 2,391,409 A * | 12/1945 | Geist et al. ............... | 174/72 C |
| 3,118,017 A * | 1/1964 | Wimbish .................... | 174/97 |
| 3,357,370 A * | 12/1967 | Walkey ...................... | 104/275 |
| 4,819,910 A * | 4/1989 | Johnston .................... | 254/88 |
| 5,095,822 A * | 3/1992 | Martin ....................... | 174/101 |
| 5,267,367 A * | 12/1993 | Wegmann, Jr. ............. | 14/69.5 |
| D370,717 S | 6/1996 | Ziaylek, Jr. et al. | |
| 5,777,266 A | 7/1998 | Herman et al. | |
| 6,202,565 B1 * | 3/2001 | Henry ........................ | 104/275 |
| 6,481,036 B1 | 11/2002 | Duvall | |
| 6,499,410 B1 * | 12/2002 | Berardi ....................... | 104/275 |
| 6,718,588 B1 * | 4/2004 | Frederiksen ................ | 14/69.5 |
| 6,747,212 B1 | 6/2004 | Henry | |
| 6,878,881 B1 * | 4/2005 | Henry ........................ | 174/101 |

OTHER PUBLICATIONS

Yellow Jacket Cable Protectors brochure (2 pages), Duarte, California U.S.A., no date.
Peterson Systems International, Yellow Jacket AMS [online], [retrieved on Jul. 1, 2006]. Retrieved from the Internet <URL:http:wwww.petersonsystems.com/content/cable_protectors/yjams.php4>.

* cited by examiner

*Primary Examiner*—Dean A. Reichard
*Assistant Examiner*—Adolfo Nino
(74) *Attorney, Agent, or Firm*—Dorr, Carson & Birney, P.C.

(57) ABSTRACT

A modular cable protector has a side ramp extending laterally outward and downward from the top to the base along one side of the cable protector, and a side ramp cover extending laterally outward and upward from the base to the top along the opposing side of the cable protector. The side ramp cover can be use to abut and cover the side ramp of an adjacent cable protector with the tops of the cable protectors in vertical alignment to form a substantially continuous surface.

19 Claims, 8 Drawing Sheets

MODULAR CABLE PROTECTOR

BACKGROUND OF THE INVENTION

1. Field of the Invention

The present invention relates generally to the field of modular cable protectors. More specifically, the present invention discloses a modular cable protector that can be used to laterally extend an assembly of cable protectors and thereby provide additional sets of channels in parallel.

2. Statement of the Problem

Hose and cable bridging protective devices have been used in the past to prevent damage for hoses, cables, wiring and the like by vehicles and pedestrians. These cable protectors also help to minimize the risk of pedestrians tripping over cables. For the purposes of this disclosure, the term "cable" should be broadly interpreted to include cables, hoses, electrical wiring, conduits, optical fibers, pneumatic tubing, plumbing, and the like.

Conventional cable protectors include one or more channels extending in parallel between the ends of the cable protector to receive the cables. Side ramps or beveled edges extend laterally outward from both sides of the cable protector to allow vehicles to roll over the top of the cable protector. Each cable protector typically includes a set of end connectors that enable a series of cable protectors to be attached together in a modular end-to-end fashion to any desired length.

A problem arises if two or more sets of cable protectors with side ramps must be used in parallel. This creates an uneven traveling surface with multiple inclines and declines for vehicles or pedestrians crossing the cable protectors. Therefore, a need exists for a means of combining sets of cable protectors in parallel to create a structure with a relatively uniform top surface.

For example, one approach to this problem is disclosed in the applicant's U.S. Pat. No. 6,747,212 (Henry). This patent shows an adapter assembly with tapered lateral edges that bridges the void between the side ramps of two cable protectors. The adapter assembly can also include channels for cables.

3. Solution to the Problem

In contrast, the present invention addresses this problem by providing a modular cable protector with an undercut side ramp cover on one side that complements and abuts the side ramp of an adjacent cable protector. This enables the assembly of cable protectors to be expanded laterally outward to add parallel channels while maintaining a relatively flat top surface across the assembly.

SUMMARY OF THE INVENTION

This invention provides a modular cable protector having a side ramp extending laterally outward and downward from the top to the base along one side of the cable protector, and a side ramp cover extending laterally outward and upward from the base to the top along the opposing side of the cable protector. The side ramp cover can be use to abut and cover the side ramp of an adjacent cable protector with the tops of the cable protectors in vertical alignment to form a substantially continuous surface.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
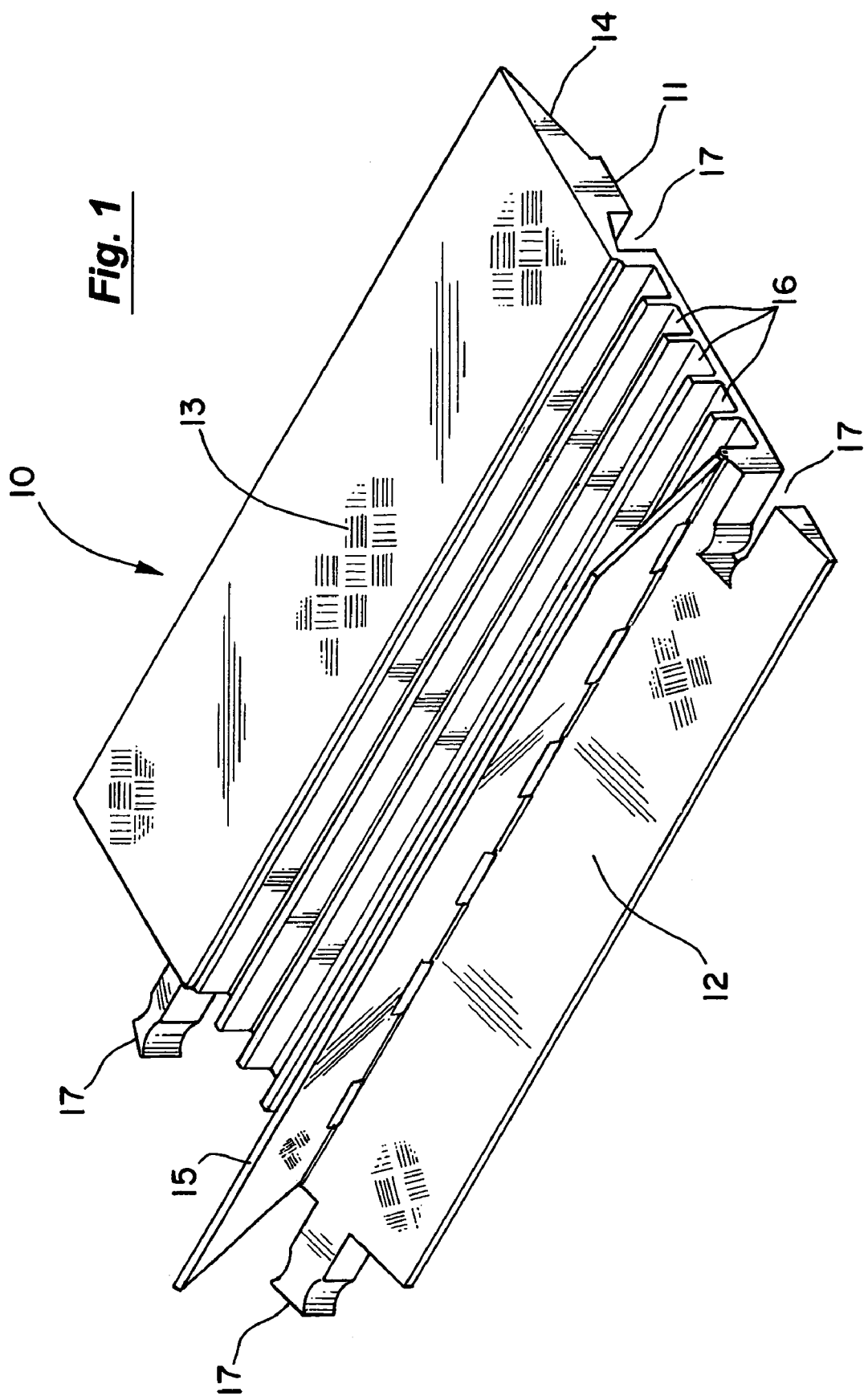
FIG. 1 is a top perspective view of a cable protector 10 with its lid 15 open.
Figure 2:
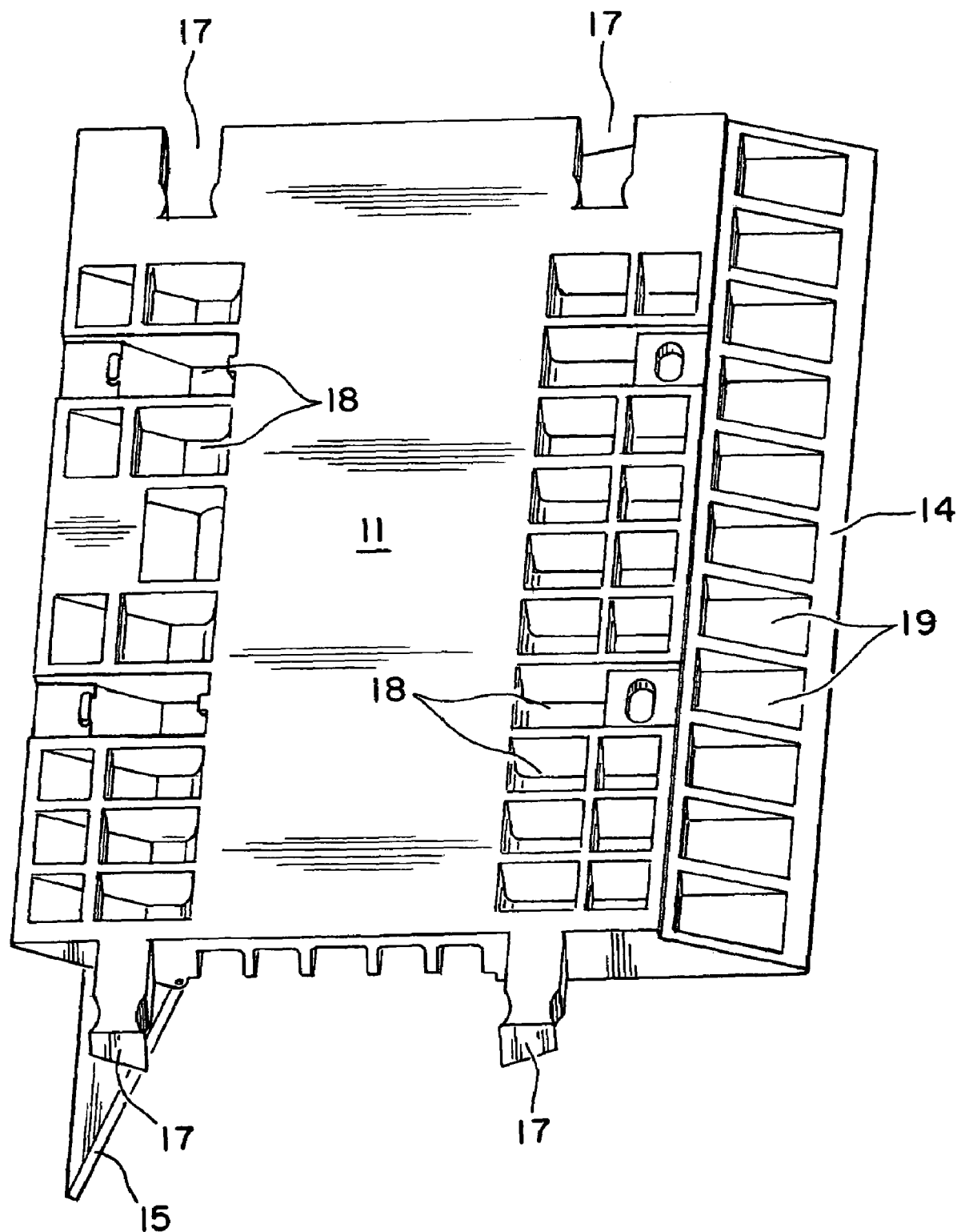
FIG. 2 is a bottom perspective view of the cable protector 10 corresponding to FIG. 1.

Turning to FIG. 1, a top perspective view is provided showing one embodiment of the present invention. A corresponding bottom perspective view is shown in FIG. 2. The cable protector 10 has a base 11 in contact with the ground, and a top 13 extending in a generally horizontal plane above the base 11 determined by the thickness of the cable protector 10. In this embodiment, the top 13 and base 11 are substantially parallel to one another. However, other configurations could be readily substituted. The top surface 13 can be relatively smooth or textured for increased traction.

A side ramp 12 extends laterally outward and downward from the top 13 to the base 11 to form one lateral side of the cable protector. The upper edge of the side ramp 12 forms an obtuse angle with the top 13 and its lower edge forms an acute angle with the base 11. The embodiment shown in the drawings has a well-defined linear edge between the top 13 and the side ramp 12. It should be understood that this transition could be rounded or curved so that the top 13 and side ramp 12 merge to some degree.

Figure 4:
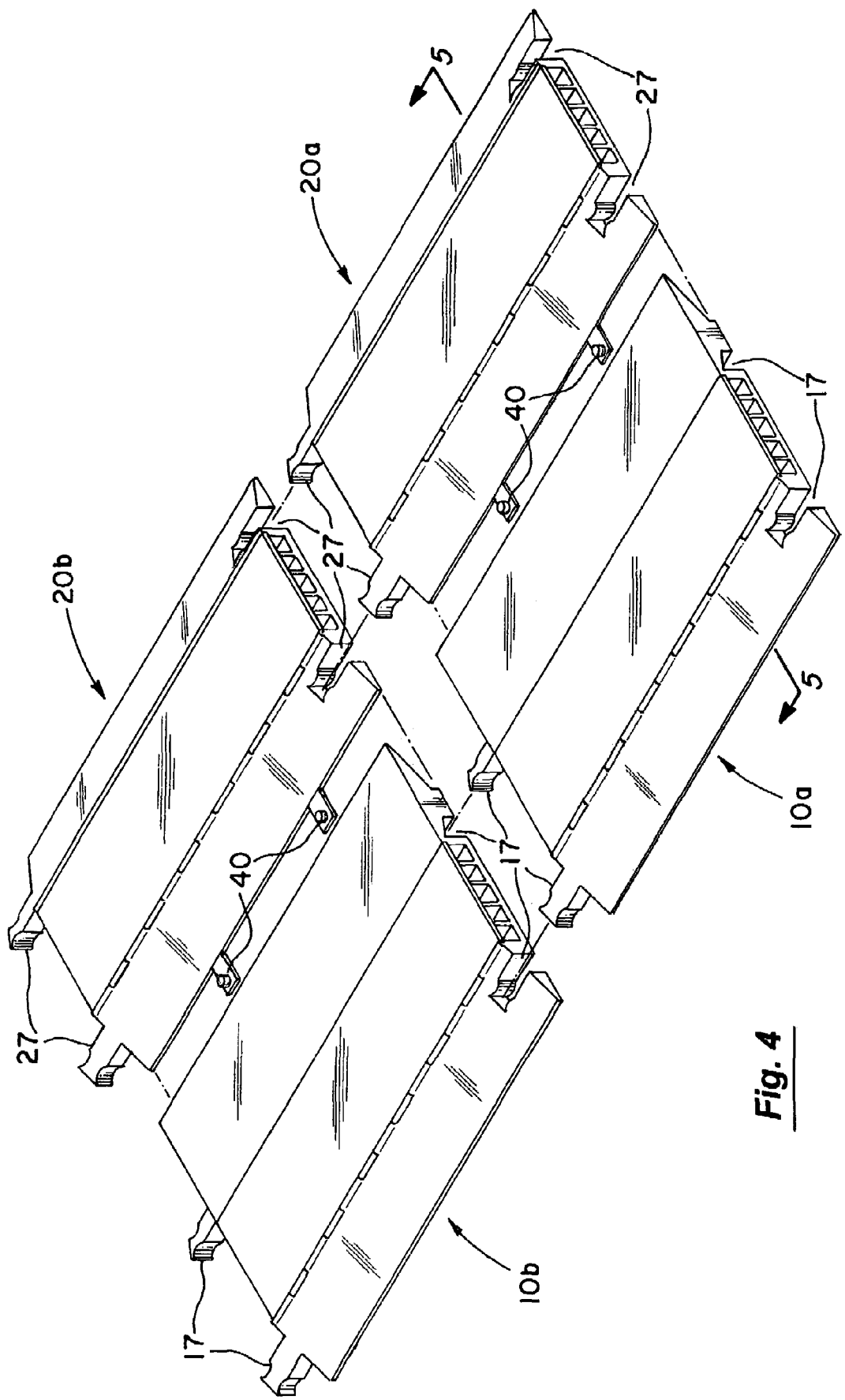
FIG. 4 is an exploded perspective view of a cable protector 10a being assembled in series with a second cable protector 10b, and in parallel with conventional cable protectors 20a, 20b.
Figure 5:
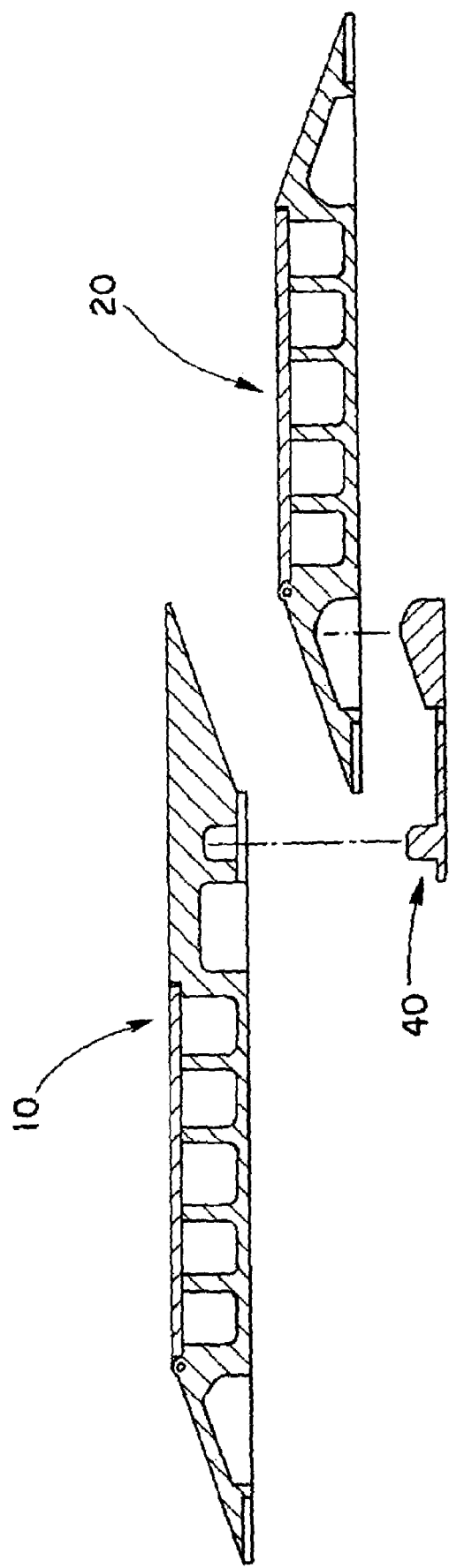
FIG. 5 is an exploded cross-sectional view showing the assembly of cable protectors 10 and 20 with a bottom connector 40.
Figure 6:
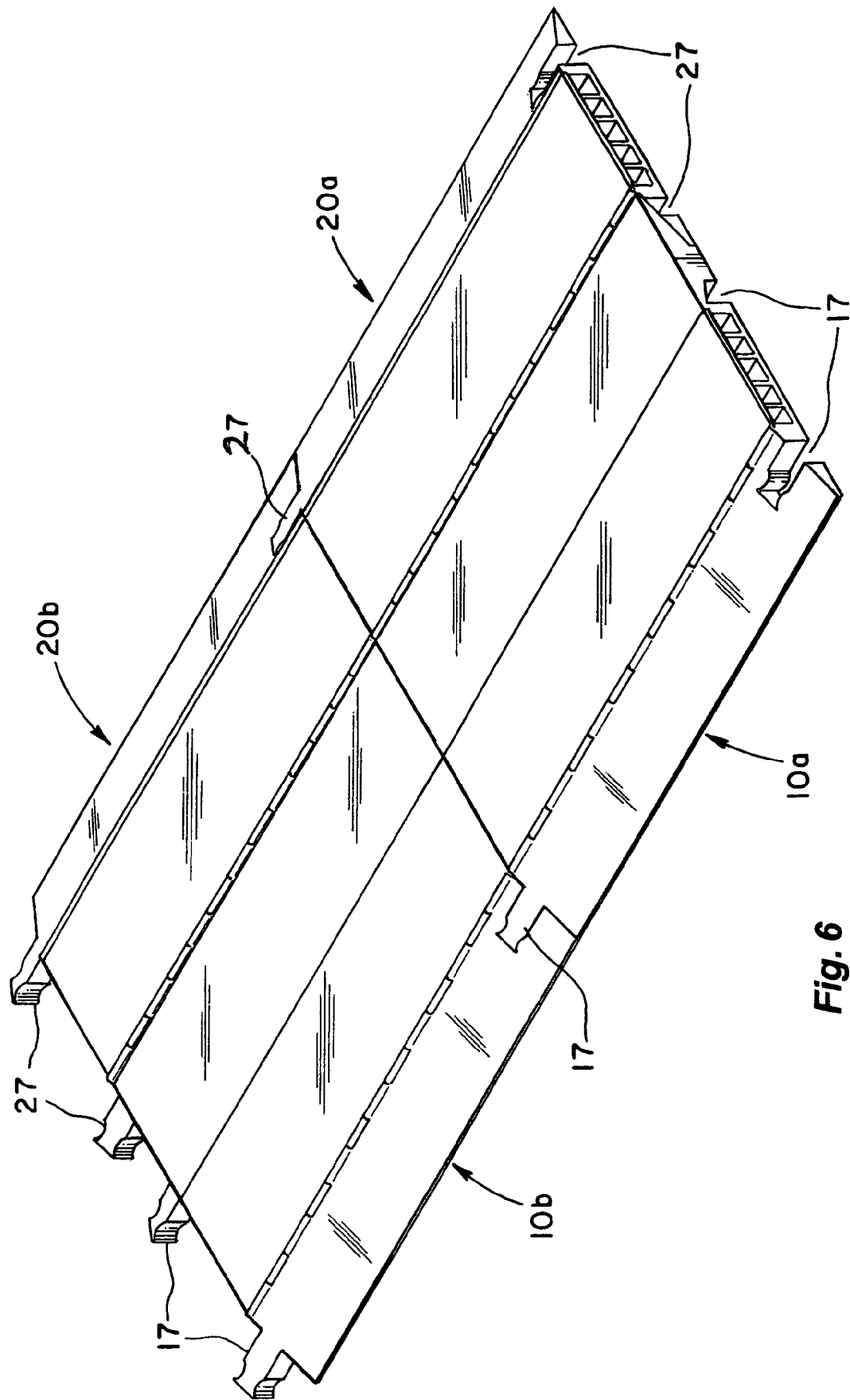
FIG. 6 is a perspective view of the finished cable protector assembly corresponding to FIG. 4.

A side ramp cover 14 extends laterally outward and upward from the base 11 to the top 13 to form a second, opposing lateral side of the cable protector. Thus, the lower edge of the side ramp cover 14 forms an obtuse angle with the base 11, and its upper edge forms an acute angle with the top 13. The side ramp cover 14 is undercut so that it will abut and cover the side ramp 22 of an adjacent cable protector 20, as shown in FIGS. 4–6. In this embodiment, the side ramp cover 14 and the adjacent side ramp 22 are substantially planar and have complementary angles. In other words, the top 13 and side ramp cover 14 form a wedge-shaped member that complements the side ramp 22 of an adjacent cable protector 20. This allows contact between the side ramp cover 14 and adjacent side ramp 22 over much of their respective surface areas, which increases structural strength and stability. However, other embodiments of the side ramp cover 14 are possible, such as a curved undercut surface or a series of vertical ribs separated by voids.

Figure 3:
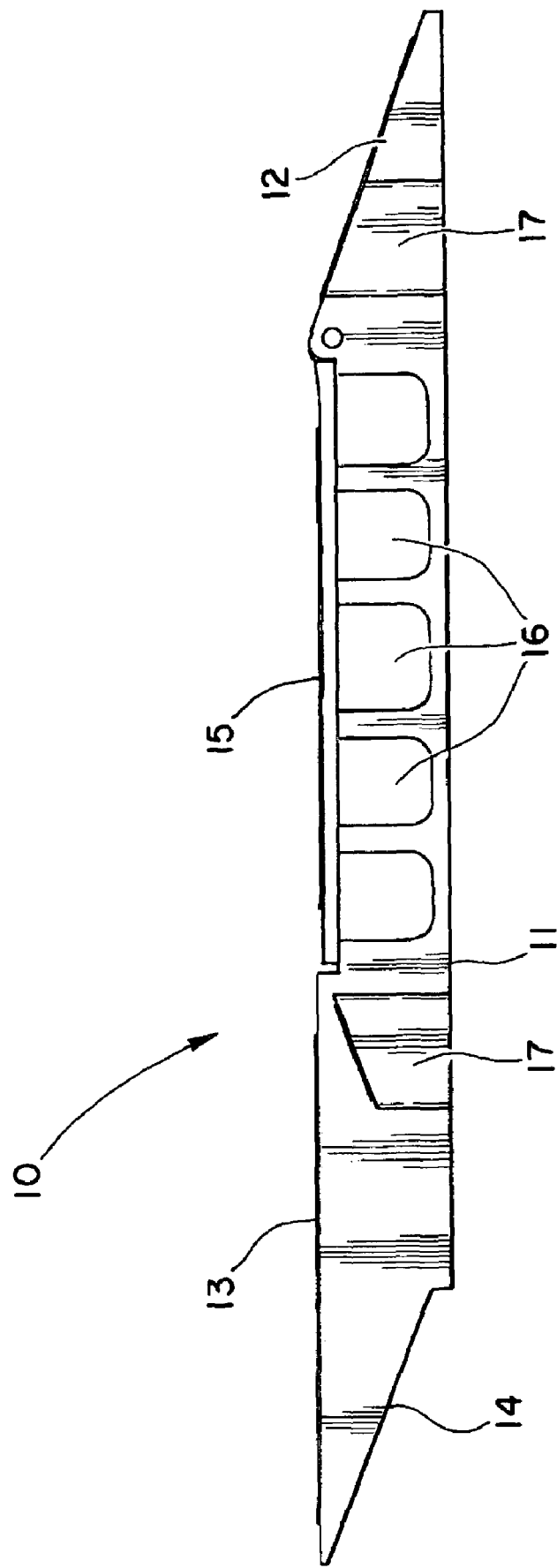
FIG. 3 is an end view of the cable protector 10.

In the embodiment depicted in the drawings, the side ramp 12 and side ramp cover 14 are substantially planar and extend parallel to one another. Similarly, the base 11 and top 13 are substantially planar and extend parallel to one another. This results in a cable protector 10 with a vertical cross-section in the general shape of a parallelogram, as shown in the end view depicted in FIG. 3. Here again, other cross-sectional configurations could be readily substituted.

The cable protector 10 also includes a number of channels 16 for cables extending longitudinally along the cable protector. These channels 16 are designed to align with corresponding channels on adjacent cable protectors when the cable protectors are laid out in series (i.e., in an end-to-end manner). The embodiment shown in the drawings has channels 16 recessed into the top 13 of the cable protector 10. It should be understood that the channels could formed in the base 11 or elsewhere.

Optionally, the channels 16 can be covered with a lid 15. The lid 15 serves to protect the cables in the channels 16, and it also provides a more even surface to help reduce the risk of a pedestrian tripping on the channels 16. Alternatively, the lid can be hinged, or it could be removable, or it could be held in place with connectors or fasteners.

The ends of the cable protector 10 can be equipped with sets of end connectors 17 to removably fasten a plurality of cable protectors together in series. For example, male and female "dog bone" shapes can be used as shown in the drawings. Other possibilities include L-shaped or T-shaped connectors. Typically, the end connectors 17 on the cable protector 10 are compatible with the end connectors 27 found conventional cable protectors 20.

The cable protector can be formed using conventional polymers, such as polyurethane, or composite materials. A number of voids 18, 19 can be molded into the base 11 and the side ramp cover 14 to reduce weight and manufacturing costs.

Figure 7:
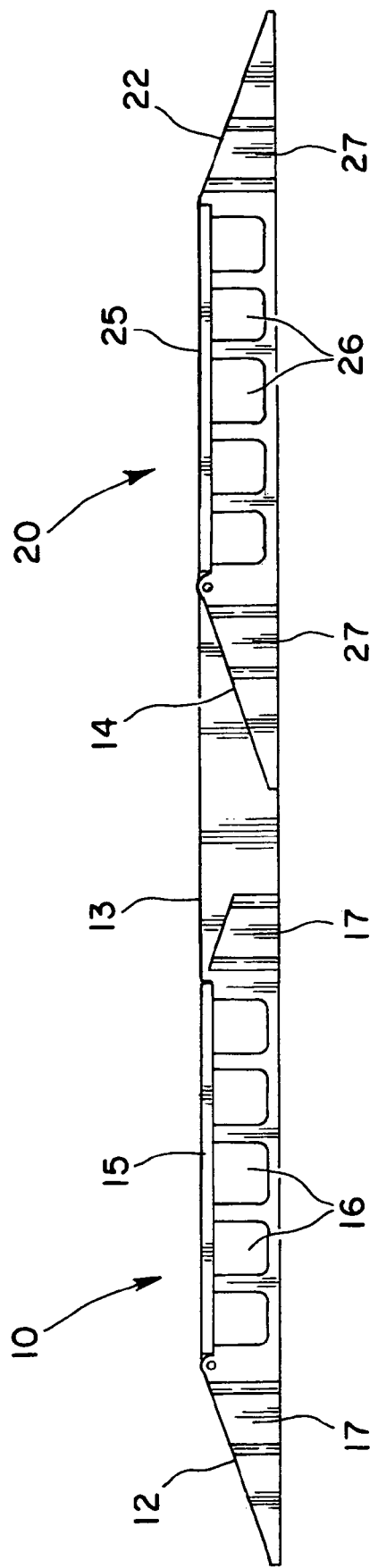
FIG. 7 is an end view of a cable protector 10 assembled with a conventional cable protector 20.

FIGS. 4 through 7 illustrate an assembly of four cable protectors 10a, 10b, 20a and 20b using the present invention. In particular, cable protectors 10a, 10b embodying the present invention can be used to laterally extend conventional cable protectors 20a, 20b and thereby add more channels in parallel. Conventional cable protectors 20a, 20b typically have a central section housing a number of channels 26 with a lid 25 and two opposing side ramps 22. End connectors 27 can be used to attach conventional cable protectors 20a, 20b in series. FIG. 4 is an exploded perspective view of a cable protector 10a being assembled in series with a second cable protector 10b, and in parallel with conventional cable protectors 20a, 20b. FIG. 6 is a perspective view of the finished cable protector assembly corresponding to FIG. 4. FIG. 7 is a corresponding end view of the finished assembly.

During assembly, the side ramp cover 14 of each cable protector 10a, 10b is moved into contact with the side ramp 22 on the adjacent conventional cable protector 20a, 20b to extend the assembly in the parallel direction. In addition, the end connectors 17 on the cable protectors 10a, 10b can be used to engaged other cable protectors in series. The tops 13 of the cable protectors 10a, 10b are substantially in vertical alignment with the tops of the adjacent cable protectors 20a, 20b to form a substantially continous surface for traffic across the top of the assembly, as shown in FIG. 6. Thus, the present invention is entirely modular in that it enables conventional cable protectors 20a, 20b to be extended in parallel on either or both sides to any desired degree. In addition, the present invention allows the laterally-extended cable protectors 10a, 10b to be continued in series to any desired length.

Bottom connectors 40 can be used to removably secure the cable protector 10 in parallel to an adjacent cable protector 20, as shown in FIG. 4. For example, these bottom connectors 40 can be designed to removably seat in the voids in the bottoms of the cable protectors 10 and 20 as shown in the exploded cross-sectional view provided in FIG. 5.

Figure 8:
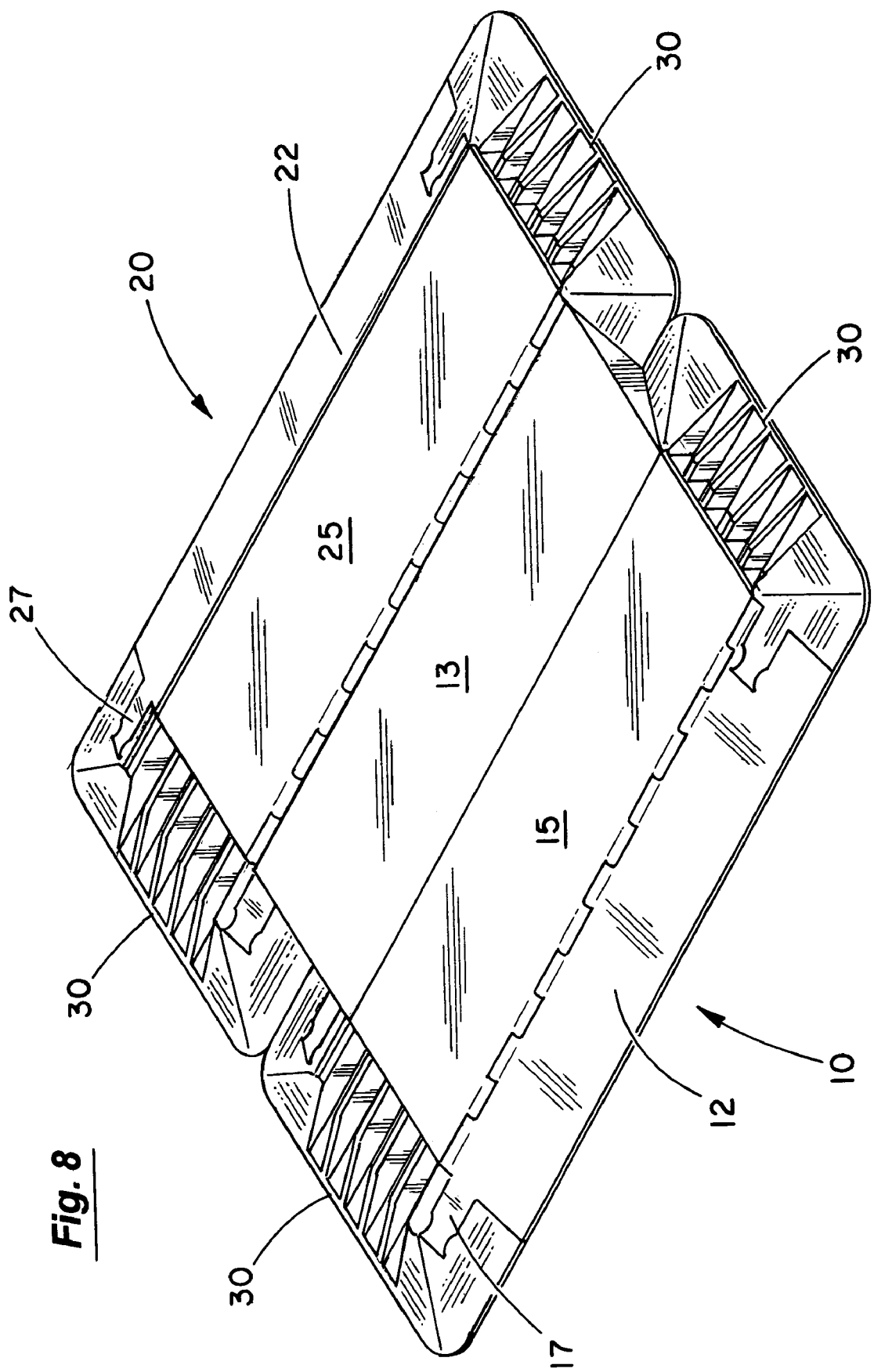
FIG. 8 is a perspective view of an assembly of cable protectors 10 and 20 with several end pieces 30.

As shown in FIG. 8, optional end pieces 30 can be used to engage the end connectors 17, 27 on the cable protectors 10, 20 to improve aesthetics and conceal the exposed end connectors 17, 27.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A cable protector comprising:
   a base;
   a top;
   at least one channel extending longitudinally along the cable protector;
   a side ramp extending laterally outward and downward from the top to the base to form a first lateral side of the cable protector; and
   a side ramp cover extending laterally outward and upward from the base to the top to form a second, opposing lateral side of the cable protector.

2. The cable protector of claim 1 wherein the vertical cross-section of the cable protector has the shape of a parallelogram.

3. The cable protector of claim 1 wherein the channels extend along the top of the cable protector, and further comprising a lid covering the channels.

4. The cable protector of claim 1 further comprising opposing ends with end connectors for series connection of a plurality of cable protectors.

5. The cable protector of claim 1 further comprising a void recessed into the base.

6. The cable protector of claim 5 further comprising a bottom connector removably seating in the void in the base to removably secure the cable protector to an adjacent cable protector in parallel.

7. The cable protector of claim 1 further comprising a void recessed into the side ramp cover.

8. The cable protector of claim 1 wherein the top is substantially parallel to base.

9. The cable protector of claim 1 wherein the side ramp is substantially parallel to the side ramp cover.

10. A cable protector to abut an adjacent cable protector having a top and a side ramp, said cable protector comprising:
    a base;
    a top substantially in vertical alignment with the top of an adjacent cable protector to thereby form a substantially continuous surface;
    at least one channel extending longitudinally along the cable protector;
    a side ramp extending laterally outward and downward from the top to the base to form a first lateral side of the cable protector; and
    a side ramp cover extending laterally outward and upward from the base to the top to form a second, opposing lateral side of the cable protector for abutting a side ramp of an adjacent cable protector.

11. The cable protector of claim 10 wherein the channels extend along the top of the cable protector, and further comprising a lid covering the channels.

12. The cable protector of claim 10 further comprising opposing ends with end connectors for series connection of a plurality of cable protectors.

13. The cable protector of claim 10 further comprising a void recessed into the base.

14. The cable protector of claim 13 further comprising a bottom connector removably seating in the void in the base to removably secure the cable protector to an adjacent cable protector in parallel.

15. A cable protector comprising:
  a base;
  a top substantially parallel to the base;
  at least one channel extending longitudinally along the top of the cable protector;
  a side ramp extending laterally outward and downward from the top to the base to form a first lateral side of the cable protector; and
  a side ramp cover extending laterally outward and upward from the base to the top to form a second, opposing lateral side of the cable protector substantially parallel to the side ramp.

16. The cable protector of claim 15 further comprising a lid covering the channel.

17. The cable protector of claim 15 further comprising opposing ends with end connectors for series connection of a plurality of cable protectors.

18. The cable protector of claim 15 further comprising a void recessed into the base.

19. The cable protector of claim 18 further comprising a bottom connector removably seating in the void in the base to removably secure the cable protector to an adjacent cable protector in parallel.

* * * * *